United States Patent [19]

Ohara

[11] Patent Number: 4,876,556
[45] Date of Patent: Oct. 24, 1989

[54] BEAM RECORDER WITH A TEMPERATURE SENSOR FOR LIGHT QUANTITY CONTROL

[75] Inventor: Yuji Ohara, Kanagawa, Japan

[73] Assignee: Fuji Photo Film Co., Ltd., Kanagawa, Japan

[21] Appl. No.: 175,430

[22] Filed: Mar. 30, 1988

[30] Foreign Application Priority Data

Mar. 30, 1987 [JP] Japan .................................. 62-77323

[51] Int. Cl.$^4$ ......................... G01D 15/14; H04N 1/23
[52] U.S. Cl. ..................................... 346/108; 358/298
[58] Field of Search ..................... 346/108, 76 L, 160; 358/296, 298

[56] References Cited

U.S. PATENT DOCUMENTS 4,719,474  1/1988  Hansen ............................... 346/108

Primary Examiner—Harold Broome
Assistant Examiner—Mark Reinhart
Attorney, Agent, or Firm—Sughrue, Mion, Zinn, Macpeak & Seas.

[57] ABSTRACT

A light beam recording apparatus modulates a light beam on the basis of image information and deflects the modulated light beam to scan a photosensitive recording material, thereby recording an image born by the image information on the recording material. The light beam recording apparatus is provided with a temperature sensor for detecting the temperature of the photosensitive recording material, and the quantity of light in the light beam is controlled on the basis of the output of the temperature sensor to compensate for change in the photosensitivity of the recording material with change in the temperature of the recording material.

2 Claims, 3 Drawing Sheets

BEAM RECORDER WITH A TEMPERATURE SENSOR FOR LIGHT QUANTITY CONTROL

BACKGROUND OF THE INVENTION

1. Field of the Invention

This invention relates to a light beam recording apparatus for recording an image by deflecting a light beam modulated on the basis of image information to scan a photosensitive recording material.

2. Description of the Prior Art

There has been known a light beam recording apparatus which modulates a light beam on the basis of image information and deflects the modulated light beam to scan a photosensitive recording material, thereby recording an image born by the image information on the recording material. In order, to obtain a precise and reliable image in the light beam recording apparatus, the relation between a given image signal and the image density recorded on the recording material on the basis of the given image signal must not fluctuate.

However, since the photosensitivity of the photosensitive recording material changes depending on its temperature, the relation between a given image signal and the image intensity recorded on the recording material on the basis of the given image signal fluctuates depending on the temperature of the recording material during recording. When such a fluctuation in image density occurs in recording of an image for medical use in which high gradation is required, diagnostic efficiency of the image is deteriorated.

SUMMARY OF THE INVENTION

In view of the foregoing observations and description, the primary object of the present invention is to provide a light beam recording apparatus in which the relation between a given image signal and the image density recorded on a photosensitive recording material on the basis of the given image signal can be held constant irrespective of the temperature of the recording material.

The light beam recording apparatus in accordance with the present invention is characterized by having a temperature sensor for detecting the temperature of the photosensitive recording material, and a light quantity control means which controls the quantity of light in the light beam on the basis of the output of the temperature sensor.

For example, when the temperature of the recording material rises and the photosensitivity of the recording material is increased, the light quantity control means reduces the quantity of light in the light beam to compensate for the increase in the photosensitivity so that the relation between a given image signal and the image density recorded on the recording material on the basis of the given image signal is held constant.

The temperature sensor may be arranged to directly detect the temperature of the recording material, or may be arranged to detect the temperature of the recording material by way of the temperature around the recording material. As the light quantity control means, various means can be employed. For example, the light beam recording apparatus is generally provided with a gradation correction means for effecting a gradation correction in which, in order to obtain a desired image density on the basis of an image signal irrespective of the energy density-image density characteristics of the recording material, the image signal is converted into a predetermined signal. The gradation correction means has a conversion table on the basis of which the image signal is converted. The light quantity control means may be means for rewriting the conversion table according to the temperature of the recording material. Otherwise, the light quantity control means may comprise an optical element such as an optical filter disposed in the optical path of the light beam.

DESCRIPTION OF THE PREFERRED EMBODIMENTS

Figure 1:
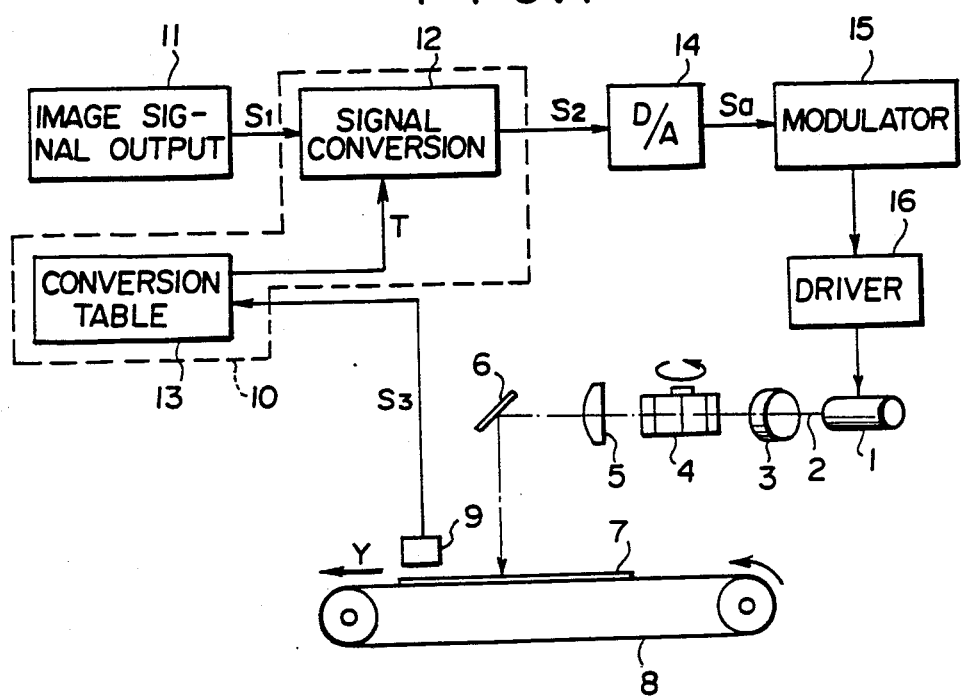
FIG. 1 is a schematic view showing a light beam recording apparatus in accordance with an embodiment of the present invention.

In FIG. 1, a light beam 2 emitted from a semiconductor laser 1 is collimated by a collimator lens 3 and then impinges upon a light deflector 4 which may be a multi-face rotating mirror. After reflected by the light deflector 4, the light beam 2 travels through a condenser lens 5 which generally comprise an fθ lens and is reflected by a long mirror 6 toward a photosensitive recording material 7, thereby scanning the photosensitive recording material in the direction substantially perpendicular to the direction of arrow Y (main scanning). While the light beam 2 scans the recording material 7 in the main scanning direction, the recording material 7 is conveyed by a conveyor 8 such as of an endless belt in the direction of the arrow Y (sub-scanning). The recording material 7 is thus two-dimensionally scanned. The light beam 2 has been modulated on the basis of an image signal S1 output from an image signal output device 11, and accordingly, a latent image of the image born by the image signal S1 is recorded on the recording material 7 when exposed to the light beam 2. The image signal S1 is a digital signal, and is converted into a signal S2 on the basis of a predetermined conversion table at a signal converting section 12 as will be described in more detail later. The signal S2 is converted into an analogue signal Sa by a D/A convertor 14 and then input into a modulator 15. The modulator 15 controls a driver 16 of the semiconductor laser 1 on the basis of the analogue image signal Sa to modulate the light beam 2.

The light beam recording apparatus shown in FIG. 1 is provided with a gradation correction means 10 in order to obtain desired image signal-image density characteristics, i.e., the relation between the image signal S1 and the density D recorded on the photosensitive recording material 7 on the basis of the image signal S1. In this particular embodiment, the gradation correction means 10 comprises the aforementioned signal converting section 12 and a conversion table preparing section 13. This gradation correction means 10 will be described in detail, hereinbelow.

Figure 2:
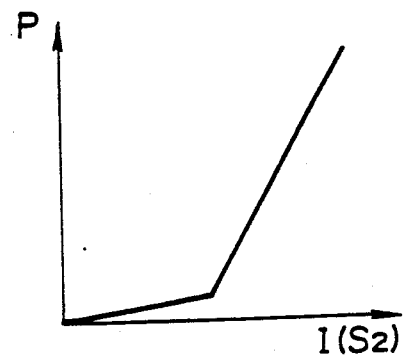
FIG. 2 is a graph showing the relation between the semiconductor laser driving current and the light output of the semiconductor laser.
Figure 3:
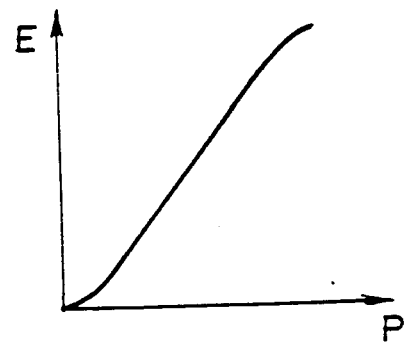
FIG. 3 is a graph showing the relation between the light output of the semiconductor laser and the energy density.
Figure 4:
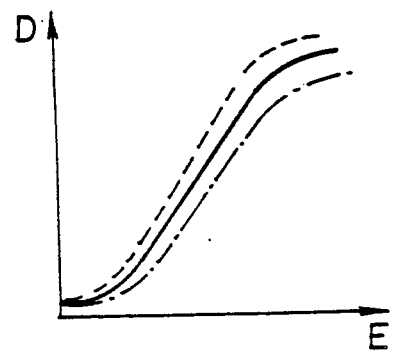
FIG. 4 is a graph showing the relation between the energy density of the light beam and the image density.

As is well known, the relation between the driving current I of the semiconductor laser 10 and the light output P of the same is as shown in FIG. 2. The driving current I is controlled to be proportional to the signal S2 obtained by converting the signal S1 on the basis of the conversion table at the signal converting section 12. The relation between the energy density E of the light beam 2 and the light output P of the semiconductor laser 1 which determines the image density recorded on the recording material 7 is as shown in FIG. 3. Further, the relation between the energy density E and the image density at a certain temperature is as shown by the solid line in FIG. 4. The relation between the signal S2 and the image density D derived from the relations shown in FIGS. 2 to 4 is as shown in the first quadrant in FIG. 5. When it is assumed that the desired relation between the image signal S1 output from the image signal output device 11 and the image density D is as shown in the second quadrant in FIG. 5 (in proportion), this desired relation has been stored in the conversion table preparing section 13, and the conversion table preparing section 13 prepares a conversion table T for converting the image signal S1 into a desired signal S2 on the basis of the aforesaid two relations. That is, images signals S1 adapted to obtain the image densities D corresponding to signals S2 of various levels on the basis of the image signal-image density characteristics are obtained, and then a gradation correction curve f representing the relation between the image signal S1 and the signal S2 is obtained. The conversion table preparing section 13 prepares the conversion table T on the basis of the curve f, and the image signal S1 is converted into the signal S2 at the signal converting section 12 on the basis of the conversion table T.

Figure 5:
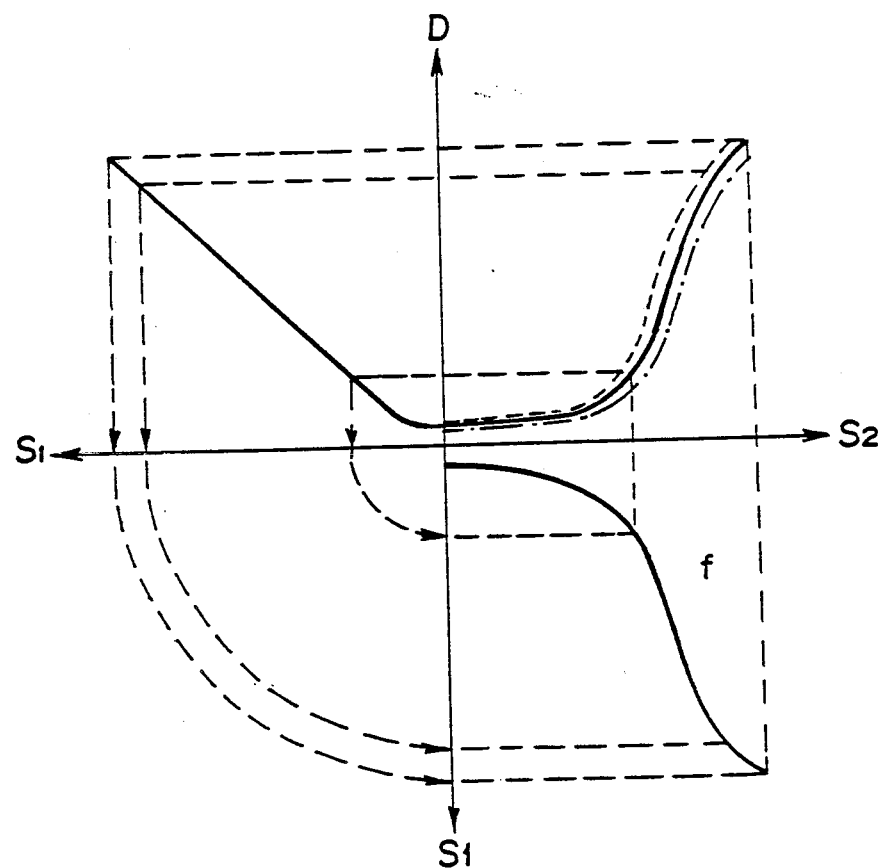
FIG. 5 is a graph for illustrating preparation of the conversion table.

By converting the image signal S1 into the signal S2 on the basis of the conversion table T thus prepared when recording the image born by the image signal S1 on the photosensitive recording material 7, the desired relation between the image signal S1 and the image density D recorded on the recording material 7 shown in the second quadrant in FIG. 5 can be obtained.

When the temperature of the photosensitive recording material 7 changes, the photosensitivity of the same changes. For example, when the temperature of the photosensitive recording material having the image density characteristics shown by the solid line in FIG. 4 at a predetermined temperature rises, the image density characteristics of the recording material change to those shown by the broken line in FIG. 4. On the other hand, when the temperature of the recording material is lowered, the image density characteristics thereof change to those shown by the chain line in FIG. 4. When the image density characteristics of the recording material change, the relation between the signal S2 and the image density D also changes as shown by the broken line or the chain line in FIG. 5. Accordingly, in order to obtain the desired relation between the image signal S1 and the image density D irrespective of the temperature of the recording material, the gradation correction curve f must be changed according to the temperature of the recording material. In this embodiment, the a temperature sensor 9 is provided to detect the temperature of the recording material 7 and to change the gradation correction curve f (i.e., to rewrite the conversion table T) according to the temperature of the recording material 7.

The temperature sensor 9 is disposed above the conveyor 8 close thereto. The temperature sensor 9 may be adapted to detect the recording material's own temperature or to detect the temperature of a part related to the temperature of the recording material 7. The temperature sensor 9 inputs a temperature signal S3 representing the detected temperature to the conversion table preparing section 13. In the conversion table preparing section 13, there have been stored a plurality of characteristic curves representing the relation between the signal S2 and the image density D at various temperatures. When the temperature signal S3 input into the conversion table preparing section 13 changes, the gradation correction curve f is changed on the basis of the characteristic curve representing to the relation between the signal S2 and the image density D at the temperature represented by the temperature signal S3. The conversion table preparing section 13 prepares the conversion table T on the basis of the changed gradation correction curve f, and the signal converting section 12 converts the image signal S1 into the signal S2 on the basis of the conversion table T thus rewritten.

Though, in the embodiment described above, means for rewriting the conversion table according to the temperature of the recording material is employed as the light quantity control means, the light quantity control means may be in other various forms so long as it can change the quantity of light in the light beam scanning the recording material. For example, the light quantity control means may comprise a multiplier which uniformly increases or decreases the image signal S1 by a predetermined rate. Further, the light quantity control means may comprise an optical element.

Figure 6:
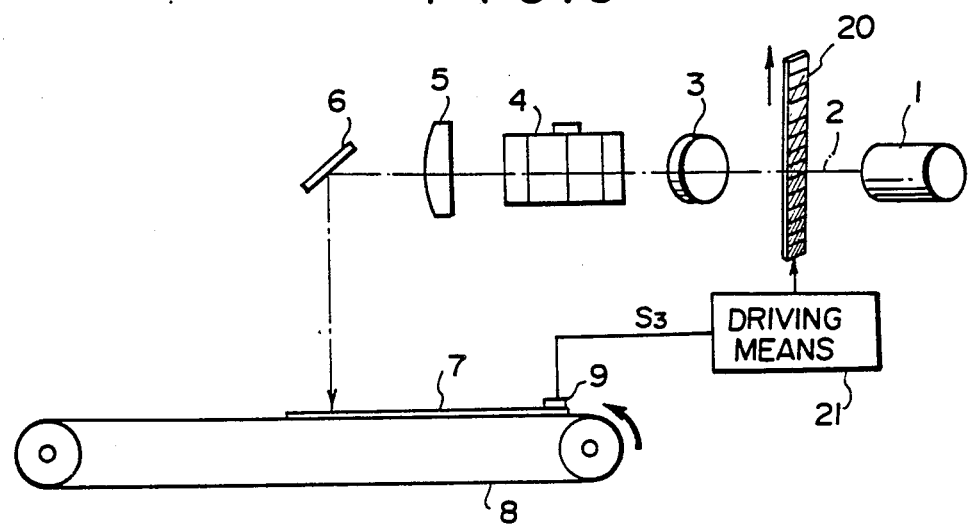
FIG. 6 is a schematic view showing a light beam recording apparatus in accordance with another embodiment of the present invention.

In another embodiment of the present invention shown in FIG. 6, an optical filter 20 the density of which continuously changes from one end toward the other end thereof is inserted into the optical path of the light beam 2. The optical filter 20 is moved in the longitudinal direction thereof by a driving means 21 according to the output of the temperature sensor 9 so that as the temperature of the recording material rises and the photosensitivity of the same increases, a part of the filter 20 having a higher density is positioned in the optical path of the light beam 2. In the embodiment shown in FIG. 6, the temperature sensor 9 is in contact with the recording material 7.

I claim:

1. A light beam recording apparatus which modulates a light beam on the basis of information in an image signal and deflects the modulated light beam to scan a photosensitive recording material, thereby recording an image borne by said image information on said recording material, characterized by having a temperature sensor for detecting the temperature of said photosensitive recording material, and a light quantity control means which controls the quantity of light in the light beam on the basis of the output of the temperature sensor, wherein said light beam recording apparatus includes a graduation correction means in which said image signal is converted to a predetermined signal according to a conversion table, for obtaining an image density based on said image signal irrespective of the energy density-image density characteristics of said recording material, and wherein said light quantity control means includes means for rewriting said conversion table according to temperature in said graduation correction means.

2. The light beam recording apparatus of claim 1 wherein said apparatus is applicable to medical radiation image recording.

* * * * *